(12) United States Patent
Turnquist et al.

(10) Patent No.: US 6,460,857 B1
(45) Date of Patent: Oct. 8, 2002

(54) BRUSH SEAL SEGMENT END BRISTLE PROTECTION AND FLEXIBILITY MAINTENANCE DEVICE AND METHODS OF FORMING THE SEGMENT

(75) Inventors: Norman Arnold Turnquist, Sloansville; Frederick George Baily, Ballston Spa; Christopher Edward Wolfe, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 09/659,561

(22) Filed: Sep. 11, 2000

(51) Int. Cl.[7] ................................................ F16J 15/44
(52) U.S. Cl. ....................................... 277/355; 277/416
(58) Field of Search ................................. 277/355, 546, 277/416

(56) References Cited

U.S. PATENT DOCUMENTS

| | | |
|---|---|---|
| 5,090,710 A | 2/1992 | Flower |
| 5,110,033 A | 5/1992 | Noone et al. |
| 5,961,280 A * | 10/1999 | Turnquist et al. ........... 277/355 |
| 6,139,018 A * | 10/2000 | Cromer et al. ............... 277/355 |

* cited by examiner

Primary Examiner—Anthony Knight
Assistant Examiner—Alison K. Pickard
(74) Attorney, Agent, or Firm—Enrique Abarca; Patrick K. Patnode

(57) ABSTRACT

A brush seal segment includes a plurality of bristles disposed between a pair of backing plates. The bristles are welded to one another adjacent their proximal ends and to the edges of the backing plates remote from the bristle tips. An end plate is welded to the end faces of the backing plates at each of the opposite ends of the segment. Each end plate terminates at approximately one-half the length of the bristles along the end face to prevent the bristles from bending circumferentially and axially during handling while maintaining substantially uniform flexibility of the bristles throughout the entire length of the segment.

16 Claims, 1 Drawing Sheet

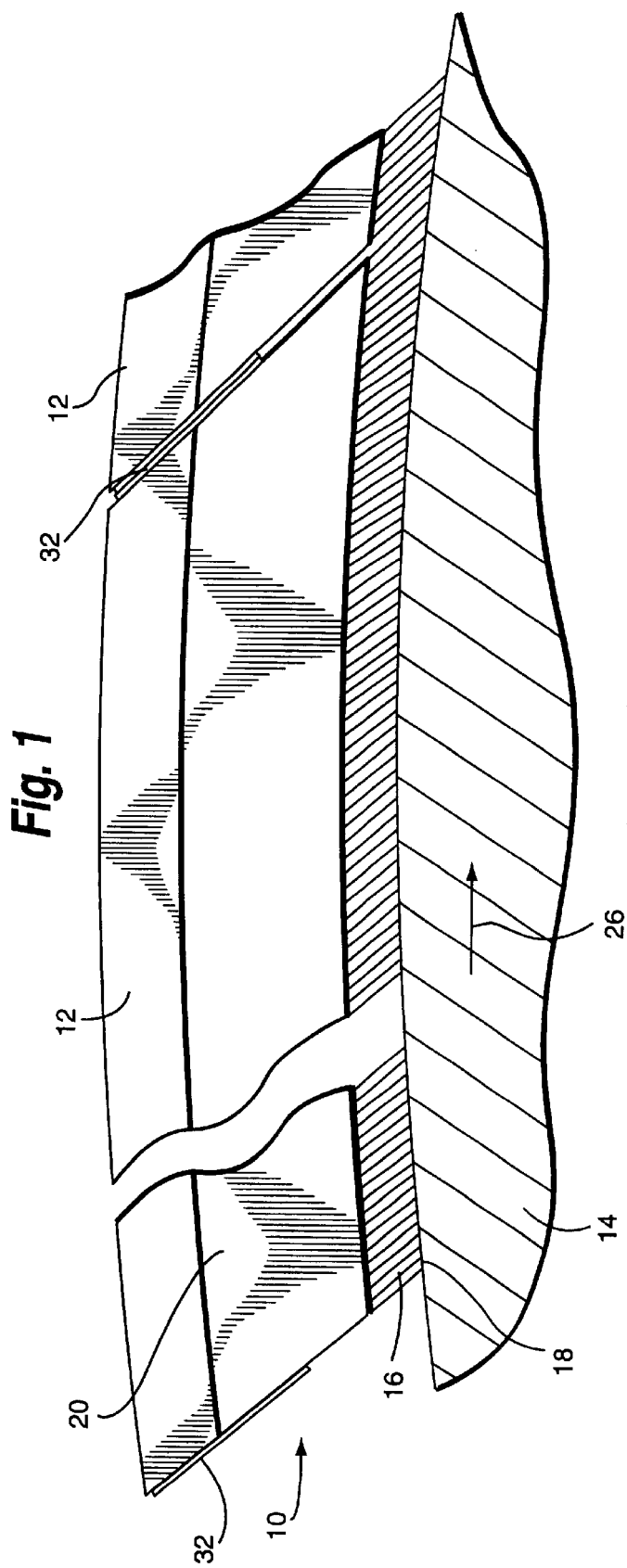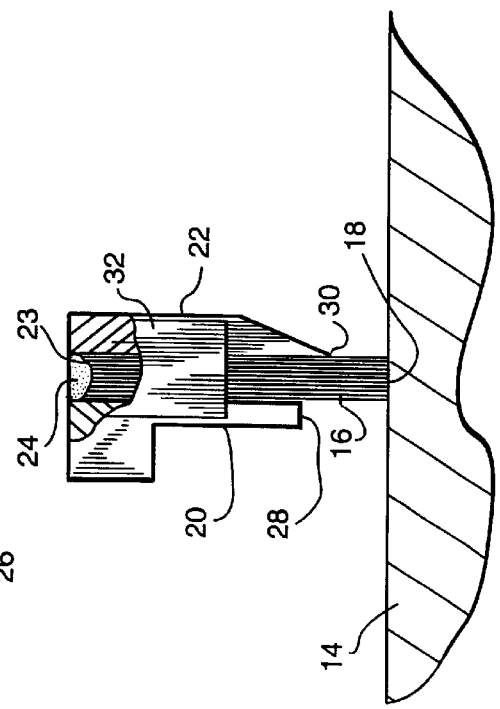

BRUSH SEAL SEGMENT END BRISTLE PROTECTION AND FLEXIBILITY MAINTENANCE DEVICE AND METHODS OF FORMING THE SEGMENT

BACKGROUND OF THE INVENTION

This invention relates to brush seals of the type having one or a pair of backing plates with bristles extending therefrom for sealing engagement with another component and, more particularly, relates to brush seal segments having end plates for protecting the end bristles from damage during handling while maintaining substantially uniform flexibility of the bristles over the length of the brush seal segment.

Brush seals for power generation equipment such as turbines are typically of a segmented design to facilitate assembly. For example, arcuate brush seal segments conventionally comprise one or a pair of backing plates with bristles extending along a face of the one plate or between the pair of backing plates. For ease of description, the invention is described in relation to a brush seal segment having two backing plates with bristles therebetween, although the description is also intended to embrace a brush seal with only one backing plate unless otherwise noted. The bristles have tips projecting beyond the backing plates and into engagement with an adjacent component. In most applications, the arcuate segments are assembled in a circumferential array of, for example, four or six segments, to completely surround, or lie within, an adjacent component, typically a rotating shaft or sleeve. Because the brush seals are generally employed between regions at different pressures, the backing plate on the low pressure downstream side typically has a greater radial extent toward the bristle tips than the backing plate on the higher pressure upstream side. The bristles conventionally lie between the backing plates, secured to one component, and may extend radially, but preferably extend at a skewed radial angle in the direction of rotation of the other component. The opposite ends of the arcuate segments have end faces at substantially the same skewed radial angle as the bristles. The bristles are secured in the arcuate seal segment by, for example, welding along the outer diameter of the arcuate seal segments and along proximal ends of the bristles between the backing plates such that the bristles extend inwardly at a skew angle to engage the rotating component.

It will be appreciated that the bristles at the ends of each segment can be bent or damaged during handling and may tend to flare out from between the backing plates, potentially becoming trapped between adjacent segments during the assembly process. These end bristles are thus easily deflected in either or both circumferential and axial directions. If the bristles bend over the backing plates, the adjacent seal segments, when assembled, trap the bristles between the end faces. Those trapped bristles may cause the segments to "arch-bind" the entire seal assembly. By this is meant that the trapped bristles force all of the segments away from the component in which the bristles are to form the seal. For example, if the brush seal is disposed about a rotating shaft, the arcuate segments may be forced radially outwardly by the trapped bristles to increase the overall diameter of the seal and hence open up the radial clearance of the rotor. Leakage past the seal is thus increased in addition to the increased leakage that results from the damaged bristles in the first instance.

Further, it is important to minimize the heating effect caused by frictional contact between the brush seal bristles and the rotating component. For example, in steam turbine rotors, unequal heating in a circumferential direction about the rotor may cause sufficient stress in the rotor to bow the rotor. Rotor bowing is exacerbated if there is a proud portion on the rotor which is differentially heated by contact with the brush bristles. In a prior brush seal design described in U.S. Pat. No. 5,110,033, an end tab provided on one of the backing plates at each end of the arcuate segment extends radially to a diameter of the opposed backing plate. The end tab, backing plates and bristles at the segment ends are welded, i.e., fused to one another. It is important, however, that flexibility of the bristles be substantially uniform throughout the circumferential extent of the arcuate segment. If there is differential flexibility, i.e., some bristles being stiffer than other bristles, the stiffer bristles will cause excessive heat to be generated through local frictional contact with the rotating component which can lead to rotor bowing and an unbalanced rotor, with consequent deleterious effects. Because the end bristles adjacent the ends of the backing plates are welded to one another and to the backing plates in the aforementioned patent, the end bristles at opposite ends of these segments are considerably stiffer than the bristles intermediate the end bristles, i.e., the bristles extant between opposite ends of the seal segment. Thus, adverse and differential heating effects in the rotor arise as a result of variations in flexibility of the bristles along the circumferential extent of the seal. In U.S. Pat. No. 5,090,710, a plate is secured across the end of a seal segment by brazing or welding, and extends to the edge of the backing plates. The bristles at the ends of the segment are therefore less flexible and stiffer than those bristles intermediate the segment ends, with similar adverse effects as noted above. Accordingly, there is need for an arcuate brush seal segment to protect the end bristles during manufacture and handling and, additionally, when affording that protection, to provide substantially uniformly flexible bristles throughout the circumferential extent of the seal.

BRIEF SUMMARY OF THE INVENTION

In an embodiment of the invention, a brush seal segment end bristle protection and flexibility maintenance device is provided to protect the end bristles and also maintain their flexibility substantially throughout the entire length of the segments. To accomplish this, the end faces of each arcuate segment are each provided with an end plate or shim which terminates intermediate the edges of the backing plates at a location sufficient to eliminate or minimize the potential for damage to the bristles during handling, while simultaneously enabling the end bristles to extend substantially freely from the backing plates in a manner similar to the remaining bristles intermediate opposite ends of the segment. The end plates are secured to the backing plates. If securement to the bristles is also desired, the end plates may be secured to the bristles at a location remote from the bristle tips. For example, and in conjunction with arcuate brush seal segments for sealing about a rotating shaft, each end plate extends intermediate, preferably about medially, between the inner diameters of the upstream and downstream backing plates, confining the end bristles between the end plates and the backing plates, preventing damage to the bristles during handling. With the end plates secured only to the backing plates or to the backing plates and portions of the bristles remote from the bristle tips, i.e., radially outwardly of a pinch point, the majority of the lengths of the end bristles remain substantially free from the pinch point radially inwardly. As a consequence, flexibility of all of the bristles in the arcuate segment, including the end bristles, remain substantially the same, thereby avoiding one or more groups of bristles which may be stiffer than other bristles and avoiding the adverse heating effects from bristles having non-uniform stiffness. Thus, the problems of flared-out bristles, as well as arch-bound segments and increased stiffness of the bristles, are substantially cured by the foregoing described brush seal.

In a preferred embodiment of the invention, a brush seal comprises an arcuate brush seal segment having at least one backing plate and a plurality of bristles extending along a face of the one backing plate. The bristles are secured to the backing plates adjacent proximal ends thereof and project from an arcuate edge of the backing plate to terminate in bristle tips for forming a seal with an adjacent component. The bristles extend freely from adjacent the proximal ends thereof and an end plate overlying an end of the segment and end bristles thereon. The end plate is secured to the backing plate such that the end bristles and bristles spaced from the end bristles along the segment have substantially the same flexibility.

In a further preferred embodiment of the invention, a brush seal comprises an arcuate brush seal segment having a pair of arcuate backing plates and a plurality of bristles extending between the plates. The bristles project beyond arcuate edges of the backing plates to extend freely therefrom, and terminate at their distal ends in bristle tips for affording a seal with an adjacent component. At least one end plate overlies an end of the segment and end bristles thereof. The plate is secured to end faces of the backing plates such that the end bristles and bristles spaced along the segment from the end bristles have substantially the same flexibility.

In a still further preferred embodiment of the invention, in an arcuate brush seal segment having a pair of arcuate backing plates and a plurality of bristles extending between the plates, the bristles projecting beyond arcuate edges of the backing plates to extend freely therefrom and terminating at their distal ends in bristle tips for affording a seal with an adjacent component, a method of forming the segment comprises the step of securing at least one end plate to end faces of the backing plates such that the bristles spaced along the entire length of the segment have substantially the same flexibility.

BRIEF DESCRIPTION OF THE DRAWINGS

FIG. 1 is a fragmentary side elevational view, with positions broken out, of a pair of adjacent arcuate brush seal segments constructed in accordance with a preferred embodiment of the invention, with bristles thereof bearing against a rotary component; and FIG. 2 is a fragmentary end elevational view of a brush seal segment illustrating an end plate in accordance with a preferred embodiment of the invention.

DETAILED DESCRIPTION OF THE INVENTION

FIG. 1 illustrates a brush seal 10, formed of a plurality of arcuate brush seal segments 12 disposed generally end-to-end in a circular array thereof for sealing engagement with an adjacent component 14. In the illustrated form of the invention, brush seal 10 is typically affixed to a stationary component (not shown) for sealing engagement with a rotating component 14, for example, a shaft. Each segment of brush seal 10 includes a multiplicity of bristles 16 extending into engagement with the adjacent component to effect a seal therewith. Consequently, bristles 16 extend generally radially inward from the stationary component such that the bristle tips 18 engage along the surface of rotating shaft 14. It will be appreciated that the brush seal may be employed in other configurations, for example, where the bristles extend generally radially outward from a brush seal fixed to a stationary component for engagement along an interior surface of a component rotating about the stationary component. Additionally, the brush seal need not be circular but can be configured to form a seal with an irregular-shaped component. Accordingly, it will be appreciated that the brush seal can be utilized to seal between relatively movable components and also between, for example, high and low pressure regions on opposite sides of a seal.

Brush seal segment 12 includes a pair of backing plates 20 and 22 arranged on opposite sides of bristles 16. Bristles 16 are secured at proximal ends between backing plates 20 and 22. Preferably, proximal end portions 23 of the bristles are attached by a weld 24 (FIG. 2) to the backing plates along the margin of the backing plates remote from bristle tips 18. The bristles extending from weld 24 are free from further attachment to the segment and, in effect, constitute beams cantilevered from weld 24 as the bristles extend therefrom to bristle tips 18. As illustrated in FIG. 1, the bristles, when secured between backing plates 20 and 22, extend at an angle skewed from radii of the arcuate segment. Typically, the bristles extend at the skew angle in the direction of movement of the rotary component with which the segment forms a seal. For example, component 14 may constitute a shaft rotating in the direction indicated by the arrow 26.

Backing plates 20 and 22 have arcuate edges 28 and 30 spaced back from the bristle tips 16 distances sufficient to avoid engagement with movable component 14 throughout the full range of any rotary excursions of component 14 relative to the fixed component. In many instances, the backing plate, for example, plate 22, on a downstream side of a seal between high and low pressure regions, may constitute a labyrinth tooth forming a combination labyrinth/ brush seal. Generally, the upstream backing plate, for example, backing plate 20, has an arcuate edge 28 spaced a significant distance back from bristle tips 18 and from the arcuate edge 30 of downstream backing plate 22.

The end bristles adjacent opposite ends of segments 12 may, for example, during handling, project beyond the backing plates both circumferentially as well as axially. If the brush seal is installed with the end bristles extending either axially or circumferentially beyond the end faces of the backing plates, the seal effectiveness is diminished. Also, the seal may become arch-bound in that bristles caught between ends of adjacent segments may cause the entire seal about a rotating component to enlarge in diameter, affording a clearance between the bristle tips and the surface of the rotating component. It is also preferable to provide, along the entire length of each arcuate segment, bristles which have the same flexibility, i.e., the bristles must be uniformly flexible along the entire length of the segment;. otherwise, any bristles or groups of bristles which become stiff, or stiffer than adjacent, more flexible bristles, tend to produce greater friction and heat resulting from contact with the rotating component, which can adversely stress such component. For example, in a steam turbine, hot spots on a rotor may cause the rotor to bow and become unbalanced. Thus, not only must the bristles be maintained within the confines of the backing plates, but they must also retain substantially uniform flexibility along the length of each segment. To accomplish this, an end plate is provided, preferably at each opposite end of each segment. Each end plate 32, adjacent an end of the segment, overlies the bristles substantially over approximately one-half the length of the bristles from their securement, i.e. weld 24, to the brush seal segment, i.e., bristle tips 18. As illustrated in FIG. 2, end plate 32 terminates approximately midway along the length of the end bristles. From a review of FIG. 1, it will be appreciated that the end faces of each segment, including the end faces of the backing plates, have a skew angle corresponding to the skew angle of bristles 16. Consequently, each end plate 32, when applied to the end faces of the segments, has a similar skew angle.

In order to maintain the flexibility of the bristles adjacent opposite ends of the segment substantially the same as the flexibility of the bristles intermediate opposite ends of the segments, end plates 32 are secured only to the end faces of backing plates 20 and 22 and not to the bristles at the ends of the segments. Additionally, end plates 32 preferably extend approximately one-half the length of the bristles as previously noted. Thus, the end bristles are substantially free for flexing movement similar to that of the bristles intermediate the end bristles along the length of the segment. Preferably, end plates 32 are welded only to the end faces of backing plates 20 and 22; however, end plates 32 may also be welded to weld 24 at the proximal end of the bristles.

As illustrated in FIG. 1, end plates 32 of adjoining segments 12 butt against one another in the seal. While there is a small gap between the adjacent segments and hence a small clearance between the bristles projecting from the adjacent segments into sealing engagement with the rotary component, the gap is sufficiently small as to be insignificant in terms of sealing capacity. Moreover, when sealing between high and low pressure regions, the bristles projecting from the backing plates adjacent the ends of the segments tend to fill in any such clearance between the end bristles of adjacent segments. By not extending end plates 32 to the arcuate edges of backing plates 20 and 22 or beyond, uniform flexibility of the bristles throughout the length of the segment is maintained while the end bristles are protected during handling from extending beyond the end faces in a circumferential direction and beyond the backing plates in an axial direction. Thus, end plates 32 facilitate handling of the brush seal segments, minimizing or eliminating the possibility of the bristles in use engaging between the end faces of the arcuate segments or causing the segments to be arch-bound, while at the same time maintaining flexibility of the bristles.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A brush sea comprising:
    an arcuate brush seal segment having said bristle and a plurality of bristles extending along a face of said one backing plate, said bristles being secured to said backing plate adjacent proximal ends thereof and projecting from an arcuate edge of said backing plate to terminate in bristle tips for forming a seal with an adjacent component, said bristle extending freely from said adjacent proximal ends thereof; and
    an end plate overlying an end of said segment and end bristles thereon, said end plate being secured to said backing plate such that the end bristles and bristles spaced from the end bristles along said segment have substantially the same flexibility;
    wherein said end plate terminates at a location substantially one-half the length of said at least one backing plate and short of the arcuate edge of said at least one backing plate.

2. A brush seal according to claim 1 wherein said bristles extend at angles skewed relative to radii of said end segment, said end plate extending along the end of the segment at a substantially similar skew angle as said bristles.

3. A brush seal according to claim 1 including a second end plate overlying an opposite end of said segment and end bristles thereof at said opposite segment end, said second end plate being secured to said backing plate at said opposite segment end such that end bristles at said opposite end and bristles intermediate the end bristles along said segment have substantially the same flexibility.

4. A brush seal according to claim 3 wherein said end plates are secured solely to opposite ends of said backing plate.

5. A brush seal according to claim 3 wherein said end plates are secured solely to said backing plate and said end bristles at opposite ends of the segment and bristles intermediate the end bristles are freely flexible from adjacent said proximal ends thereof to said tips thereof.

6. A brush seal comprising:
    an arcuate brush seal segment having a pair of arcuate backing plates and a plurality of bristles extending between said plates, said bristle projecting beyond arcuate edges of said backing plates to extend freely from said backing plates and terminating at their distal tips for affording a seal with an adjacent component, at least one end plate overlying an end of said segment and end bristles thereof, said bristles spaced along said segment from the end bristles have substantially the same flexibility;
    wherein said end plate terminates at a location substantially one-half the length of said bristles and short of the arcuate edge of at least one of said backing plates.

7. A brush seal according to claim 6 wherein the bristles extend at angles skewed relative to radii of said plates, said end plate extending along the end of the segment at substantially the same skew angle as said bristles.

8. A brush seal according to claim 6 including a second end plate overlying an opposite end of said segment and end bristles thereof, said second end plate being secured to end faces of said backing plates such that the end bristles at opposite ends of the segment and bristles intermediate said end bristles have substantially the same flexibility.

9. A brush seal according to claim 8 wherein said end plates are secured solely to said backing plates.

10. A brush seal according to claim 8 wherein said end plates are secured solely to said backing plates, and said end bristles at opposite ends of the segment and bristles intermediate said end bristles are freely flexible over the majority of their lengths such that all said bristles along said segment have substantially the same flexibility.

11. A brush seal according to claim 8 wherein the bristles extend at angles skewed relative to radii of said plates, said end plates extending along the ends of the segment at a substantially similar skew angle as adjacent bristles, said arcuate edges being spaced radially from one another, and said end plates terminating at locations along end faces of said backing plates short of one of said arcuate edges of said backing plates and at locations approximately one-half the length of the bristles.

12. A brush seal according to claim 11 wherein proximal end portions of said bristles are welded to said backing plates along margins of said backing plates remote from said arcuate edges thereof, said end plates overlying said end faces adjacent said margins and extending therefrom to terminate at locations substantially one-half the length of the bristles, said end plates being secured solely to said end faces of said backing plates.

13. In an arcuate brush seal segment having a pair of arcuate backing plates and a plurality of bristles extending between said plates, said bristles projecting beyond arcuate edges of said backing plates to extend freely therefrom and terminating at their distal ends in bristle tips for affording a seal with an adjacent component, a method of forming said segment comprising the steps of securing an end plate to end faces of said backing plates such that the bristles spaced along the entire length of said segment have substantially the same flexibility;

wherein said arcuate edges are spaced radially from one another, and locating said end plate to terminate at a location along said end faces substantially one-half the length of said bristles and short of one of the arcuate edges of said arcuate backing plates.

14. A method according to claim 13 including locating the bristles to extend at angles skewed relative to radii of said plates and securing said end plate to said end faces to extend along the end of the segment at substantially the same skew angle as said bristles.

15. A method according to claim 13 including securing a second end plate to end faces of said backing plates along an opposite end of said segment.

16. A method according to claim 15 including welding said end plates solely to said end faces of said backing plates.

* * * * *